United States Patent
Wang

(10) Patent No.: US 10,218,301 B1
(45) Date of Patent: Feb. 26, 2019

(54) SYSTEM AND METHOD FOR SPEED SENSORLESS MOTOR DRIVES

(71) Applicant: Mitsubishi Electric Research Laboratories, Inc., Cambridge, MA (US)

(72) Inventor: Yebin Wang, Acton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/865,419

(22) Filed: Jan. 9, 2018

(51) Int. Cl.
*H02P 21/24* (2016.01)
*H02P 21/18* (2016.01)
*H02P 21/14* (2016.01)

(52) U.S. Cl.
CPC ............ *H02P 21/24* (2016.02); *H02P 21/141* (2013.01); *H02P 21/18* (2016.02)

(58) Field of Classification Search
CPC ........ H02P 23/14; H02P 21/141; H02P 21/18; H02P 21/24; H02P 21/14; H02P 6/34; H02P 21/0017
See application file for complete search history.

(56) References Cited

U.S. PATENT DOCUMENTS

| | | | | |
|---|---|---|---|---|
| 6,242,885 B1 * | 6/2001 | Ide | ........................ | H02P 21/22 318/805 |
| 6,377,018 B2 * | 4/2002 | Tajima | .................... | H02P 21/26 318/727 |
| 6,577,096 B2 * | 6/2003 | Cho | ....................... | H02P 21/141 318/727 |
| 6,940,253 B2 * | 9/2005 | Hinkkanen | ........... | H02P 21/141 318/803 |
| 7,276,877 B2 * | 10/2007 | Qiu | ....................... | G05B 13/048 318/453 |
| 7,598,698 B2 * | 10/2009 | Hashimoto | ............. | H02P 21/18 318/798 |
| 7,898,197 B2 * | 3/2011 | Tomigashi | .............. | H02P 21/10 318/400.02 |
| 8,183,816 B2 * | 5/2012 | Weigel | .................... | H02P 21/09 318/400.01 |
| 8,310,189 B2 | 11/2012 | Patel et al. | | |

(Continued)

*Primary Examiner* — Bentsu Ro
*Assistant Examiner* — Thai Dinh
(74) *Attorney, Agent, or Firm* — Gene Vinokur; James McAleenan; Hironori Tsukamoto

(57) ABSTRACT

A motor drive of an induction motor includes a motion controller to provide a reference signal and a memory to store a transformed model relating dynamics of a transformed state of the motor with measurements through parameters of transformed model including unknown parameters. The transformed state is a function of an electromagnetic state of the motor and parameters of transformed model. The dynamics of the transformed state is defined by a sum of components, each component is a linear function of the transformed state and at least one of the unknown parameters of the transformed model. The motor drive also include a motor controller to produce an estimate of speed and flux of the motor based on measurements and the transformed model, and to produce a reference voltage to track the reference signal based on the estimate of the speed and the flux of the motor.

20 Claims, 14 Drawing Sheets

(56) References Cited

U.S. PATENT DOCUMENTS

| | | | |
|---|---|---|---|
| 8,519,652 B2 * | 8/2013 | Ito | H02P 6/18 |
| | | | 318/400.01 |
| 8,963,459 B2 * | 2/2015 | Kim | H02P 6/183 |
| | | | 318/400.02 |
| 9,287,817 B2 | 3/2016 | Ting et al. | |
| 9,692,336 B2 | 6/2017 | Magee et al. | |
| 2016/0226414 A1 * | 8/2016 | Wang | H02P 21/18 |
| 2016/0226419 A1 | 8/2016 | Merl | |
| 2017/0201198 A1 | 7/2017 | Merl | |

* cited by examiner $$\dot{x} = A_1 x + A_2(\omega)\bar{x} + Bu$$
$$\dot{\omega} = 0$$
$$\bar{x} = \begin{bmatrix} \Phi_{dr}, \Phi_{qr} \end{bmatrix}^\top$$

$$\dot{x} = A(\omega)x + Bu$$
$$\dot{\omega} = 0$$

$$\dot{i}_{ds} = -\gamma i_{ds} + \omega_1 i_{qs} + \beta(\alpha\Phi_{dr} + \omega\Phi_{qr}) + \frac{u_{ds}}{\sigma}$$
$$\dot{i}_{qs} = -\gamma i_{qs} - \omega_1 i_{ds} + \beta(\alpha\Phi_{qr} - \omega\Phi_{dr}) + \frac{u_{qs}}{\sigma}$$
$$\dot{\Phi}_{dr} = -\alpha\Phi_{dr} + (\omega_1 - \omega)\Phi_{qr} + \alpha L_m i_{ds}$$
$$\dot{\Phi}_{qr} = -\alpha\Phi_{qr} - (\omega_1 - \omega)\Phi_{dr} + \alpha L_m i_{qs}$$
$$\dot{\omega} = 0$$

FIG. 2C $$\dot{z} = A_z z + \psi(y, u)\theta + B_z u$$
$$y = C_z z$$
$$\dot{\theta} = 0$$

SYSTEM AND METHOD FOR SPEED SENSORLESS MOTOR DRIVES

TECHNICAL FIELD

This invention relates generally to controlling electric motors, and more particularly to a method and system for controlling the angular speed of the motor without using a sensor for measuring the speed or the position of the motor.

BACKGROUND

Electric motors, particularly induction motors with variable speed, are widely used due to low maintenance cost and acceptable performance. However, the control of induction motors is challenging due to highly coupled and nonlinear dynamics. Vector control, also called field-oriented control (FOC), is a variable-frequency drive (VFD) control method where the stator currents of a three-phase AC electric motor are identified as two orthogonal components that can be visualized with a space vector. One component defines the magnetic flux of the motor, the other the torque or speed. The control system of the motor drive calculates from the flux and speed or torque references given by a high level controller the corresponding current component references. For example, proportional-integral (PI) controllers can be used to keep the measured current components at their reference values.

Speed sensorless control of the electric motors avoids measuring the speed of the motor. Such a control can also be implemented by a speed sensorless motor drive, i.e., control system that does not use a sensor to measure speed or position of the rotor of the motor. Speed sensorless motor drives are desirable due to the elimination of motor speed or position sensors, the lower cost, and the improved reliability of the resultant system. For example, conventional speed sensorless control technologies include a voltage model-based direct integration, an adaptive observer method, and an extended Kalman filter method to estimate the rotor speed.

However, the speed sensorless motor drives can fail to control the motor effectively. Specifically, a number of different speed sensorless motor drives suffer from performance degradation resulting from removing the encoder (the sensor to measure the position of the rotor) from the control loop, i.e., a position sensor from which the rotor speed can be quickly obtained. For example, the existing speed sensorless control can fail to accurately and rapidly track a fast-changing speed reference trajectory of the electric motor. To that end, the application of the speed sensorless control technologies is limited to fields requiring low or medium performance of the motor.

Accordingly, there is a need to improve the performance of the speed sensorless control of the electric motors.

SUMMARY

It is an object of some embodiments to provide a system and a method for determining a speed of an electrical motor, e.g., an angular speed of a rotor of an induction motor. It is another object of some embodiment of the invention to estimate the speed of the motor without using any sensors for measuring speed and/or position of the rotor, while maintaining an accuracy of the estimation. It is another object of some embodiments to control the motor based on the estimated speed, e.g., to reduce a difference between the estimated speed of the motor and a reference speed of the motor. It is another object of some embodiments to estimate unknown parameters of a model of an electrical motor without using any sensors for measuring speed and/or position of the rotor.

Some embodiments estimate the speed of the motor based on an error between the measured stator currents of the motor and the stator current estimated using a model of the motor. The error between the measured and the estimated stator currents can result from a number of different factors. For example, such an error can result from one or combination of noises of the measurement of the current, inaccuracy in the model of the motor used for estimating the current, and differences between actual speed of the motor and estimated speed of the motor used in the model of the motor.

A model of the motor relates a state of the motor to the measurements of the voltage and the current of the motor. For example, the electromagnetic state of the electric motor includes a current through the motor, and a flux of the motor. The model can include other parameters, including known parameters with predetermined values and unknown parameters with unknown and/or uncertain values. Example of the unknown parameters include the speed of the motor. In theory, the unknown parameters, and specifically the speed of the motor, can be determined using measurements of the operation of the motor and the baseline model. However, the motor is a dynamically coupled system, and its model includes multiplicative terms of different unmeasured state variables, which makes the estimation of the state of the motor computationally challenging.

For example, a baseline model relies on a simplified model of the motor that treats the speed of the motor as a constant parameter. The simplified model of the motor relates a derivative of the state of the motor including current and flux to a sum of a product of the state and the speed of the motor and a function of the voltage through the motor. However, because the state includes unmeasured flux, this baseline model includes a product of unmeasured flux and unmeasured speed of the motor. Such a coupling of unmeasured state parameters renders the gain tuning for the state estimator difficult to design, and the resultant estimator may not converge for some cases.

Some embodiments are based on realization that it is advantageous and possible to transform the simplified model of the motor from its original to different coordinates. For example, the simplified model can be transformed into a transformed model such that the coupling of unmeasured parameters and unmeasured state (flux) is broken up in the new coordinates system. Specifically, the transformed model of the motor, i.e., the baseline model of the motor written in the new coordinate system, relates a state of the motor, i.e., in the new coordinate system, to the measurements of the voltage and the current of the motor using a sum of the speed and the flux of the motor. More specifically, the transformed model does not include a product term of unknown parameters (including at least the speed) and unmeasured states of the motor.

Such a transformation results in a transformed model relating dynamics of a transformed state of the motor with the measurements of the sensor through parameters of the transformed model. The transformed state includes more than just the electromagnetic state of the motor defined at least in part by the current through the motor and a flux of the motor. For example, in some embodiments, the transformed state of the motor is a function of an electromagnetic state of the motor defined at least in part by the current through the motor and a flux of the motor, and the parameters of the transformed model. At least some parameters of the transformed model are unknown, wherein the unknown parameters of the transformed model include the speed of the motor. Such a transformation complicates the transformed state but allows to define the dynamics of the transformed state by a sum of components, such that each component is a linear function of the transformed state and at least one of the unknown parameters of the transformed model. In such a manner, the computation of the unknown parameters including unknown speed and flux of the motor is simplified.

To that end, some embodiments estimate the speed and model parameters of the motor using a transformed model of the motor relating a state of the motor to measurements of the voltage and the current of the motor using a sum of the speed and the flux of the motor and control the motor based on the estimated speed. For example, the transformed model is a baseline model transformed into a different coordinate system, such that the transformed model does not include a product of the speed and the flux of the motor.

For example, one embodiment estimates the speed and model parameters of the motor by solving a dynamic system of at least three ordinary differential equations (ODEs). The first ODE defines dynamics of a time-series signal as a function of the measurements of the voltage and the current. The second ODE defines dynamics of estimate of the transformed state of the motor including an estimate of a current through the motor using the time-series signal and the measurements of the voltage and the current. The third ODE defines dynamics of the estimate of the speed of the motor as a function of the time-series signal and an error between the measured and the estimated current of the motor. Those three ODEs takes advantage of the decoupled state variables in the transformed model to relate the state variables to each other through the time-series signal that depends only on available measurements of the current and the voltage, which makes the dynamic system used for estimation of the speed of the motor stable for all values of the speed. In such a manner, gains of the adaptive state estimator can be designed as constant for the entire range of speed values, which simplifies the control of the motor.

Accordingly, one embodiment discloses a motor drive for controlling an operation of an induction motor. The motor drive includes a motion controller to provide a reference signal for controlling the operation of the motor, the reference signal includes one or combination of a reference flux of a rotor of the motor and a reference speed of the rotor of the motor; at least sensor to measure a voltage to the motor and a current through the motor during the operation of the motor; a memory to store a transformed model relating dynamics of a transformed state of the motor with the measurements of the sensor through parameters of the transformed model, wherein at least some parameters of the transformed model are unknown, wherein the unknown parameters of the transformed model includes the speed of the motor, wherein the transformed state of the motor is a function of an electromagnetic state of the motor defined at least in part by the current through the motor and a flux of the motor, and the parameters of the transformed model, wherein the dynamics of the transformed state is defined by a sum of components, each component is a linear function of the transformed state and at least one of the unknown parameters of the transformed model; a motor controller to estimate the unknown parameters of the transformed model to produce an estimate of the speed of the motor and an estimate of the flux of the motor based on the measurements of the sensor and the transformed model of the motor, and to produce a reference voltage to track the reference signal based on the estimate of the speed of the motor and the estimate of the flux of the motor; and an inverter to produce the voltage to the motor based on the reference voltage.

Another embodiment discloses a method for controlling an operation of an induction motor. The method includes providing a reference signal for controlling the operation of the motor, the reference signal includes one or combination of a reference flux of a rotor of the motor and a reference speed of the rotor of the motor; measuring a voltage to the motor and a current through the motor during the operation of the motor; retrieving a transformed model relating dynamics of a transformed state of the motor with the measurements of the sensor through parameters of the transformed model, wherein at least some parameters of the transformed model are unknown, wherein the unknown parameters of the transformed model includes the speed of the motor, wherein the transformed state of the motor is a function of an electromagnetic state of the motor defined at least in part by the current through the motor and a flux of the motor, and the parameters of the transformed model, wherein the dynamics of the transformed state is defined by a sum of components, each component is a linear function of the transformed state and at least one of the unknown parameters of the transformed model; estimating the unknown parameters of the transformed model to produce an estimate of the speed of the motor and an estimate of the flux of the motor based on the measurements of the sensor and the transformed model of the motor, and to produce a reference voltage to track the reference signal based on the estimate of the speed of the motor and the estimate of the flux of the motor; and producing the voltage to the motor based on the reference voltage.

Yet another embodiment discloses a non-transitory computer readable storage medium embodied thereon a program executable by a processor for performing a method. The method includes receiving a reference signal for controlling the operation of the motor, the reference signal includes one or combination of a reference flux of a rotor of the motor and a reference speed of the rotor of the motor; receiving measurements of a voltage to the motor and a current through the motor during the operation of the motor; retrieving a transformed model relating dynamics of a transformed state of the motor with the measurements of the sensor through parameters of the transformed model, wherein at least some parameters of the transformed model are unknown, wherein the unknown parameters of the transformed model includes the speed of the motor, wherein the transformed state of the motor is a function of an electromagnetic state of the motor defined at least in part by the current through the motor and a flux of the motor, and the parameters of the transformed model, wherein the dynamics of the transformed state is defined by a sum of components, each component is a linear function of the transformed state and at least one of the unknown parameters of the transformed model; estimating the unknown parameters of the transformed model to produce an estimate of the speed of the motor and an estimate of the flux of the motor based on the measurements of the sensor and the transformed model of the motor, and to produce a reference voltage to track the reference signal based on the estimate of the speed of the motor and the estimate of the flux of the motor; and causing an operation of the motor with the voltage produced based on the reference voltage.

BRIEF DESCRIPTION OF THE DRAWINGS

FIG. 2C is different examples of the simplified model used by some embodiments to produce the transformed model of the motor;

FIG. 2D is a schematic of an example of the transformed model of the motor used by some embodiments;

DETAILED DESCRIPTION

Figure 1A:
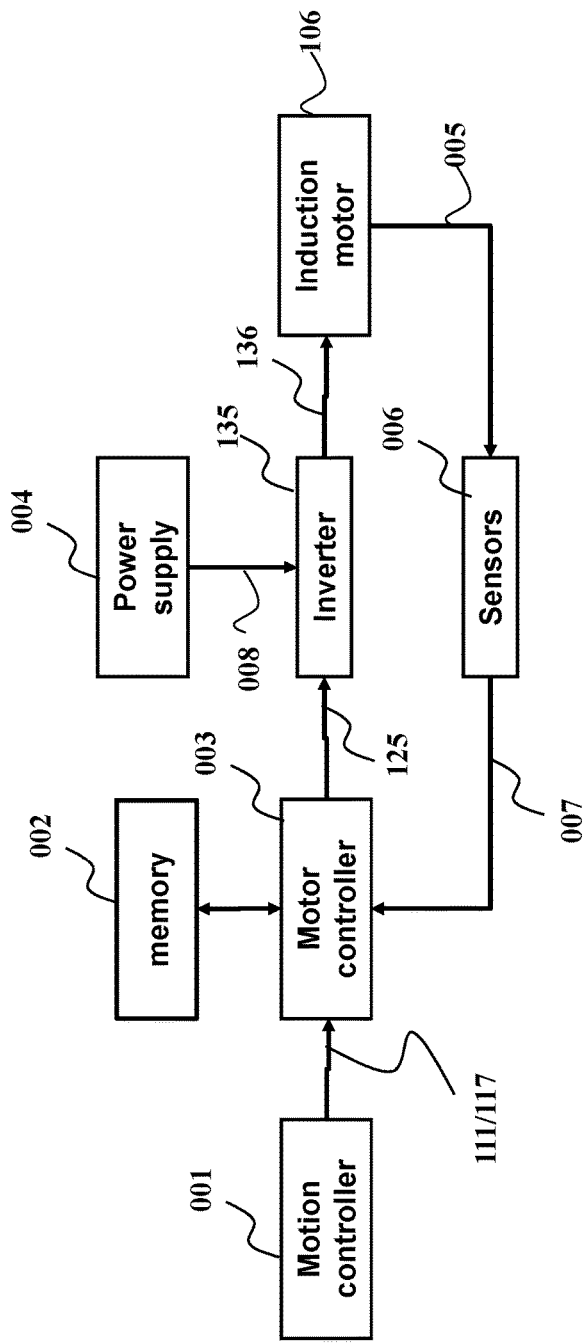
FIG. 1A is a block diagram of a motor drive to control an electric motor according to some embodiments.

FIG. 1A shows a block diagram of a motor drive to control an electric motor according to some embodiments. A motion controller 001 generates reference signal 111 and/or 117 to a motor controller 003, where reference 111 and 117 typically is a reference flux of the motor, e.g., a reference amplitude of a flux of a rotor of the electric motor and a reference speed of the motor, e.g., a reference angle speed of the rotor of the motor, respectively. Examples of the motion controller include an interface for accepting the reference signal, a processor to produce reference signal based on operation requirements of a system operated by the motor, a reference governor to modify input signals to the motor to satisfy dynamic constraints.

The motor controller 003 can included a processor to determine reference voltages 125 using a model stored in memory 002. For example, the memory 002 stores a transformed model relating dynamics of a transformed state of the motor with the measurements of the sensor through parameters of the transformed model. At least some parameters of the transformed model are unknown, and the unknown parameters of the transformed model includes the speed of the motor. The transformed state of the motor is a function of an electromagnetic state of the motor defined at least in part by the current through the motor and a flux of the motor, and the parameters of the transformed model. The dynamics of the transformed state is defined by a sum of components, each component is a linear function of the transformed state and at least one of the unknown parameters of the transformed model.

The motor drive includes at least one sensor 006 to produce measurements 007 to measure a voltage to the motor and a current through the motor during the operation of the motor. The at least one sensor 006 can include a voltage and a current sensor to measure outputs 005 of the motor 106. Additionally, or alternatively, the sensor 006 can receive the measurements 136 of the outputs of the inverter 135 and/or the reference voltage 125 of the motor controller 003.

The motor controller 003 of the motor drive is configured to estimate the unknown parameters of the transformed model to produce an estimate of the speed of the motor and an estimate of the flux of the motor based on the measurements of the sensor and the transformed model of the motor, and to produce a reference voltage 125 to track the reference signal based on the estimate of the speed of the motor and the estimate of the flux of the motor.

In some implementations, the motor drive includes an inverter 135, powered by a power supply 004, to produce the voltage 136 to the motor based on the reference voltage 125. Additionally, or alternatively, the inverter 135 can be a third-party device receiving reference voltages from the motor controller.

The motor drive can form part of a system performing an operation using the motor 106. Examples of the system includes air conditioning systems, elevators, manufacturing machines, electric propulsion systems, vehicles, etc.

Figure 2A:
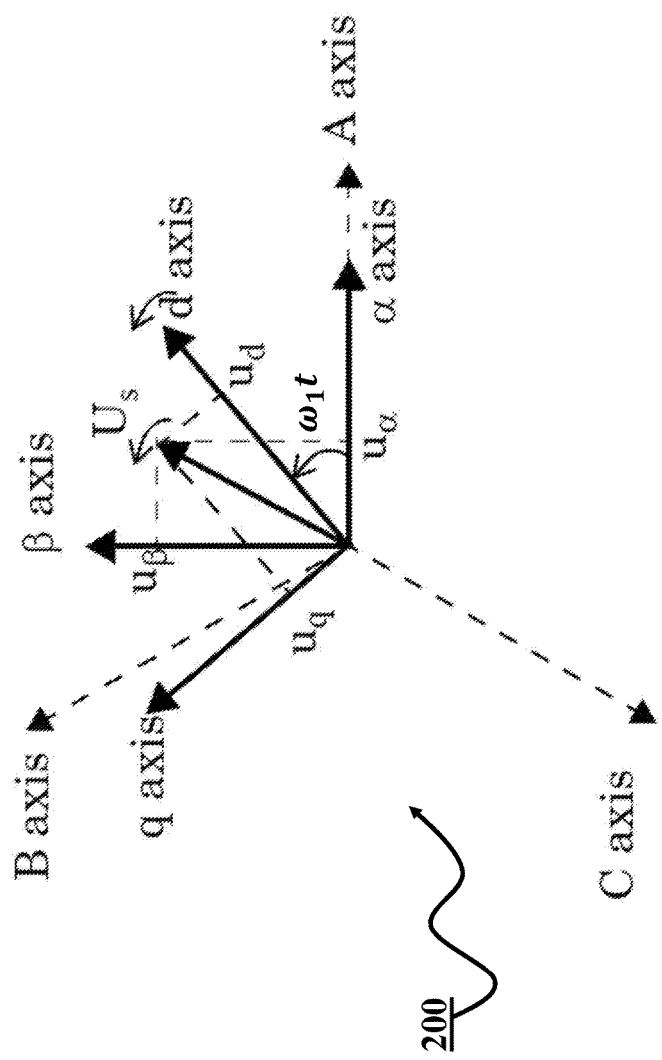
FIG. 2A is definitions of coordinates according to the embodiments of the invention.

FIG. 2A shows a system of coordinates 200 showing the relationship between three phases of the voltage used to control the motor 106 and two phases used to produce the reference voltage according to some embodiments. For example, the voltages 125 could have different number of phases, varying according to type of the motor. For a three-phase AC motor, the voltage 125 has three phases, called phase A, phase B, and phase C, corresponding to A axis, B axis, and C axis, respectively. The three phases are illustrated in FIG. 2A, which shows a fixed phase angle difference, 120°, among these three phases. An inverter 135, powered by a power supply 004, generates voltage outputs 136 that track the voltage references 125. The voltage 136 drives the motor 106. Meanwhile, sensors 006 measure a signal 005 indicative of three-phase voltages to the motor and three-phase currents flowing through the motor and output the sensed signal 007 of measured values.

Figure 1B:
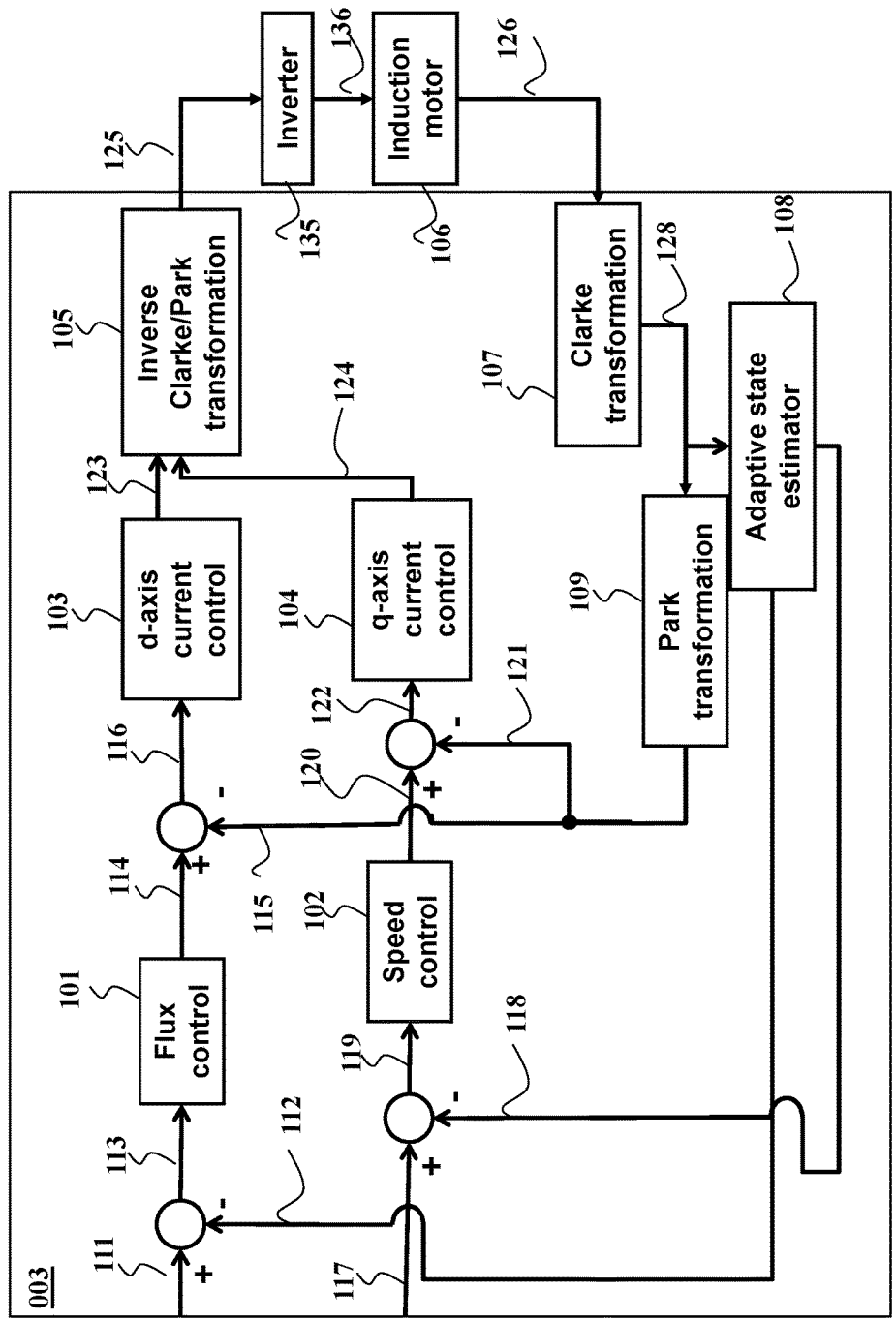
FIG. 1B is a block diagram of a sensorless field oriented control of an induction motor 106 performed by the motion controller according to some embodiments.

FIG. 1B shows a block diagram of a sensorless field oriented control of an induction motor 106 performed by the motion controller 003 according to some embodiments. The sensorless field oriented control can be represented as a code stored in the memory 002 and executed by the processor of the motion controller at real-time. However, other types of the control are within the scope of different embodiments. At least some components of the system can be implemented using one or several processors operatively connected to the motor 106. For example, at least some components of the system of FIG. 1A can be implemented as a non-transitory computer readable medium embodied thereon a program executable by a processor for performing methods of different components. For example, the program can be organized in a number of software modules for executing different functions of the control system.

A signal 111 is an amplitude reference of the rotor flux, a signal 112 is its estimate of the rotor flux outputted from an estimator 108 of a state of the induction motor 106, a signal 113 represents a difference between signals 111 and 112. A flux control block 101 determines a d-axis stator current reference value, denoted by a signal 114. A signal 115 denotes the measured stator current in d-axis. A difference signal 116 between signals 115 and 114 is used by a d-axis current control block 103 to determine a reference stator voltage in d-axis, which is part of a signal 123.

Similarly, a signal 117 denotes a desired rotor speed reference of the induction motor, and a signal 118 denotes an estimated rotor speed produced by the state estimator 108. A speed difference signal 119 between signals 117 and 118 is fed into a speed control block 102 to determine a reference stator current in q-axis, which is depicted by signal 120. A stator current in q-axis, denoted by 121, is compared to the reference stator current in q-axis 120 to produce a difference signal 122. The q-axis current control block 104 determines desired stator voltage signal in q-axis, denoted by 124.

A block 105 conducts inverse Park/Clarke transformation to convert the desired stator voltages signals in d- and q-axis into desired well-known three-phase voltages, and produces three-phase voltages, denoted as by 125, to drive the induction motor 106. The three-phase terminal voltages and the winding currents of the induction motor, denoted by 126, are measured and transformed to two-phase signal 128 by a Clarke transformation block 107. A Park transformation block 129 transforms the signal 128 into d- and q-axis to produce the current feedback signals 115 and 121. The state estimator 108 uses the transformed signal 128 to estimate the flux amplitude signal 112 and a rotor speed signal 118, as feedback signals.

Figure 1C:
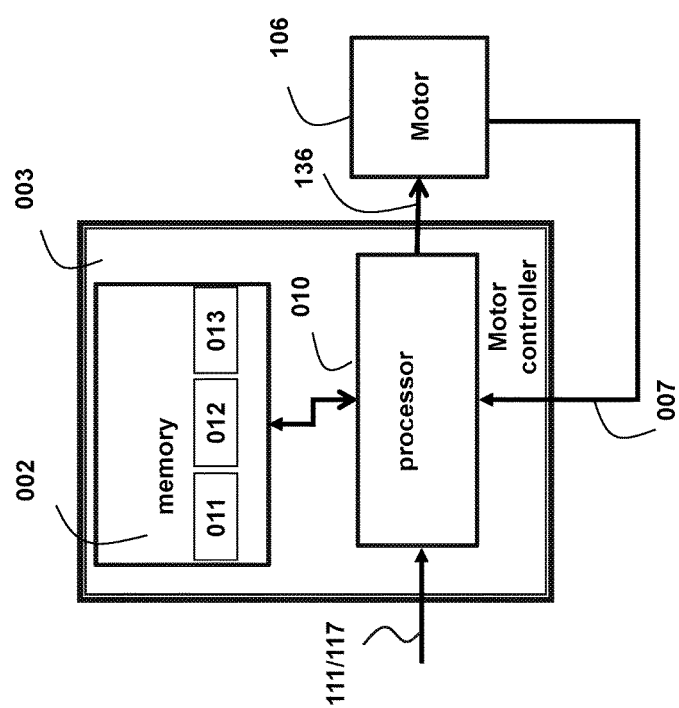
FIG. 1C is a block diagram of a general structure of the motor controller 003 according to one embodiment.

FIG. 1C shows a block diagram of a general structure of the motor controller 003 according to one embodiment. The motor controller 003 includes at least one processor 010 for executing modules of the motor controller 003. The processor 010 is connected to a memory 002 that stores the transformed model 011 of the motor, a dynamic model of an adaptive estimator, known parameters 012 of the model and current values of the unknown parameters 013 of the model, estimator parameters, etc. In this embodiment, the motor controller uses the processor 010 to solve differential equations representing the dynamic model of the adaptive estimator to estimate the speed and the flux of the motor.

To facilitate the disclosure, the following notations are used herein. Letting $\zeta$ denote a variable of the real induction motor, denote $\bar{\zeta}$ as the measured variable, $\hat{\zeta}$ as the estimate of the variable, $\zeta^*$ as the reference of the variable, $\tilde{\zeta}=\zeta-\hat{\zeta}$ as the estimation error, and $e_\zeta=\zeta^*-\zeta$ as the tracking error.

FIG. 2A shows the coordinate notation used in this disclosure. As is shown in FIG. 2A, d and q axes define a d–q frame rotating at a speed of $\omega_1$. One particular important d–q frame is aligned with a direction of the rotor flux vector. The d–q frame has a same rotational speed $\omega_1$ as the angular speed of the rotor flux vector, with its d-axis aligned with the rotor flux vector $\Phi_r$. Another important frame is when $\omega_1=0$, which is called stationary (or stator) frame. The stationary frame is denoted as $\alpha-\beta$ frame, corresponding to $\alpha,\beta$ axis in FIG. 2A. In the rest of this disclosure, unless mentioned otherwise, the frame d–q represents the stationary frame. Some notations are given in Table 1.

TABLE 1

Notations

| Notation | Description |
| --- | --- |
| $i_{ds}, i_{qs}$ | stator currents in d- and q-axis |
| $\Phi_{dr}, \Phi_{qr}$ | rotor fluxes in d- and q-axis |
| $u_{ds}, u_{qs}$ | stator voltages in d- and q-axis |
| $\omega$ | rotor angular speed |
| $\omega_1$ | angular speed of a rotating frame |
| $\Phi_r^*$ | rotor flux amplitude reference |

TABLE 1-continued

Notations

| Notation | Description |
| --- | --- |
| $\omega^*$ | rotor angular speed reference |
| $i_{ds}^*, i_{qs}^*$ | references of stator currents in d- and q-axis |
| $T_l$ | load torque |
| $J$ | inertia |
| $L_s, L_m, L_r$ | stator, mutual, and rotor inductances |
| $R_s, R_r$ | stator and rotor resistances |
| $\sigma$ | $L_s L_r - L_m^2/L_r$ |
| $\alpha$ | $R_r/L_r$ |
| $\beta$ | $L_m/(\sigma L_r)$ |
| $\gamma$ | $R_s/\sigma + \alpha\beta L_m$ |
| $\mu$ | $3L_m/(2JL_r)$ |

Various embodiment disclosed herein are not limited to speed sensorless motor drives for induction motors. The disclosure exemplifies its application to induction motors for illustration purpose.

Induction Motor Models

The Clarke transformation is a mathematical transformation employed to transform quantities in a three-phase, corresponding to A, B, and C axes in FIG. 2A, to a two-phase system, corresponding to $\alpha,\beta$ axes. Representing quantities in a space vector form significantly simplifies the analysis of three-phase systems. In this disclosure, Clarke transformation is limited to the case which transforms quantities in three-phase such as three-phase stator voltages and currents into a space vector in the stationary frame. Similarly, the Park transformation, or known as d–q transformation, projects the quantities in a stationary frame onto a rotating frame. Clarke/Park transformation and its inverse are well-known for those skilled in the art, and their rigorous description is omitted.

Some embodiments of the invention use a model of an induction motor. However, such a model can be easily modified for different types of the electric motors. With the Clarke transformations, physical quantities of the induction motor such as three-phase currents, voltages, and fluxes are represented by space vector quantities in a fixed frame. With the Park transformation, space vector quantities in the fixed frame are represented by another set of space vector quantities in a rotating frame. For those skilled in the art, a general induction motor model in a rotating frame d–q with an angular speed $\omega_1$ is given by $$\begin{aligned}
\dot{i}_{ds} &= -\gamma i_{ds} + \omega_1 i_{qs} + \beta(\alpha\Phi_{dr} + \omega\Phi_{qr}) + \frac{u_{ds}}{\sigma} \\
\dot{i}_{qs} &= -\gamma i_{qs} - \omega_1 i_{ds} + \beta(\alpha\Phi_{qr} - \omega\Phi_{dr}) + \frac{u_{qs}}{\sigma} \\
\dot{\Phi}_{dr} &= -\alpha\Phi_{dr} + (\omega_1 - \omega)\Phi_{qr} + \alpha L_m i_{ds}, \\
\dot{\Phi}_{qr} &= -\alpha\Phi_{qr} - (\omega_1 - \omega)\Phi_{dr} + \alpha L_m i_{qs}, \\
\dot{\omega} &= \mu(\Phi_{dr} i_{qs} - \Phi_{qr} i_{ds}) - \frac{T_l}{J} \\
y &= [i_{ds}\ i_{qs}]^T,
\end{aligned} \quad (1)$$

where y, representing measured signals, are currents of stator windings. If $\omega_1=0$, the induction motor model (1) is reduced to the following model in the fixed (stationary) frame A short notation of the induction motor state is given by $X=(i_{ds}, i_{qs}, \Phi_{dr}, \Phi_{qr}, \omega)^T$ in the fixed frames. Next disclosed is the state estimator design to reconstruct X for stator current measurement y, based on the model (1).

A simplified model of the motor is obtained by treating $\omega$ as a parameter, and is given by $$\dot{x}=A(\omega)x+Bu$$

$$\dot{\omega}=0$$

$$y=Cx, \qquad (2)$$

where $x=(i_{ds}, i_{qs}, \Phi_{dr}, \Phi_{qr})^T$, $u=[u_{ds},u_{qs}]^T$, and $$A(\omega) = \begin{bmatrix} -\gamma & 0 & \alpha\beta & \beta\omega \\ 0 & -\gamma & -\beta\omega & \alpha\beta \\ \alpha L_m & 0 & -\alpha & -\omega \\ 0 & \alpha L_m & \omega & -\alpha \end{bmatrix}, B = \begin{bmatrix} \frac{1}{\sigma} & 0 \\ 0 & \frac{1}{\sigma} \\ 0 & 0 \\ 0 & 0 \end{bmatrix}, C = \begin{bmatrix} 1 & 0 & 0 & 0 \\ 0 & 1 & 0 & 0 \end{bmatrix}.$$

The simplified model (2) is linear. This disclosure teaches several means to estimate state x and at least one parameter $\omega$, on the basis of the simplified model (2), with guaranteed globally exponential stability for the resultant estimator error dynamics.

Induction Motor State Estimator Design

Figure 2B:
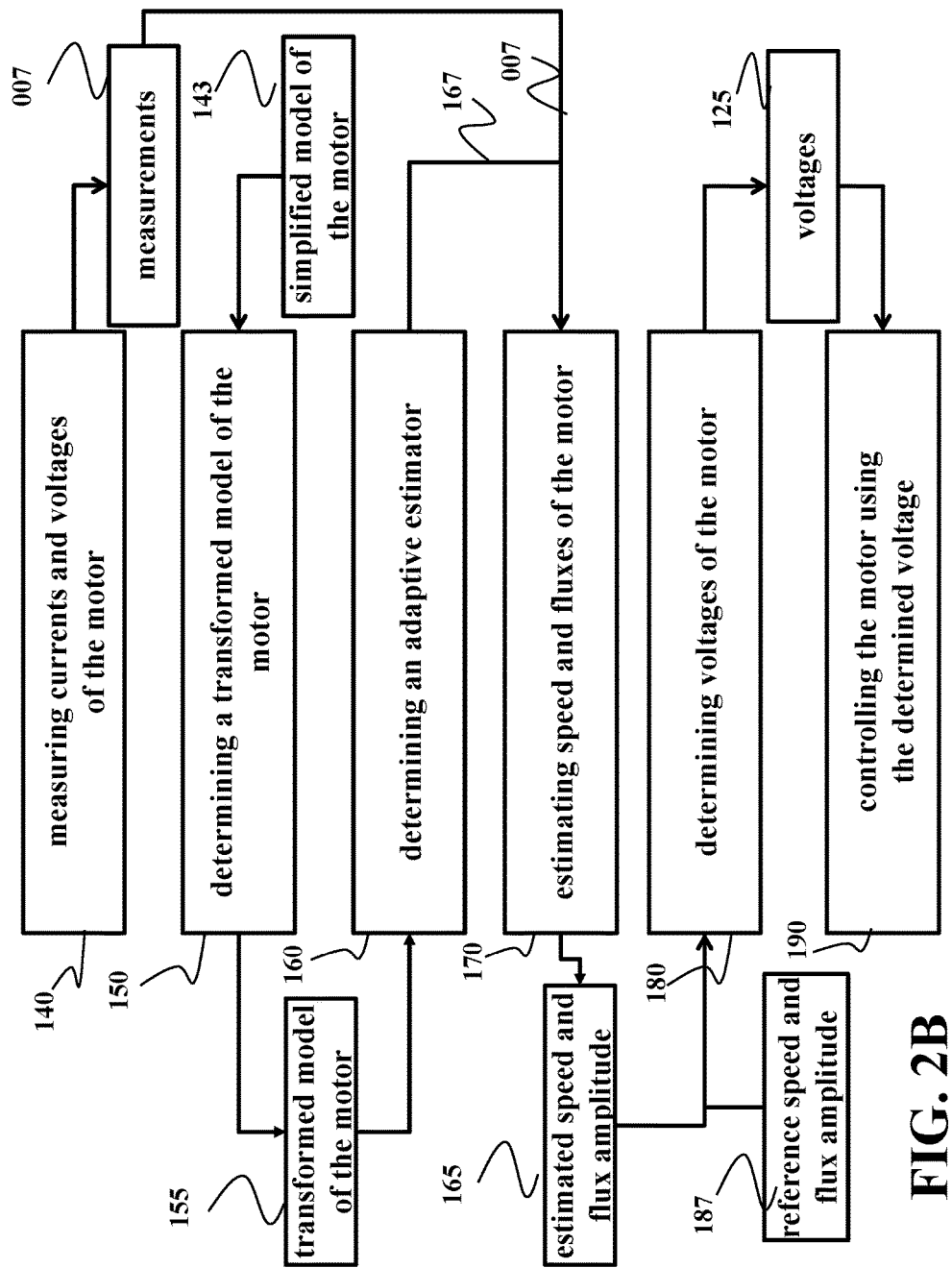
FIG. 2B is a block diagram of a method for controlling an electric motor according to one embodiment.

FIG. 2B shows a block diagram of a method for controlling an electric motor according to one embodiment. An example of the electric motor is an induction motor 106. The embodiment measures 140 a current and a voltage of the motor. For example, the measurements 007 of the voltage and/or current can be acquired from various sensors arranged at the motor and/or the inverter. For example, the measurements 007 can form at least part of the signal 126 in FIG. 1B. The embodiment determines 150 a transformed model 155 of the motor based on a simplified model 143 of the motor. The embodiment determines 160 an adaptive estimator 167 relating unmeasured speed and rotor fluxes of the motor to measured voltage and current of the motor through the transformed model 155. The transformed model 155 breaks the coupling among unmeasured parameters to simplify the state estimation. Examples of the unmeasured parameters include the rotor speed of the motor; and estimate 170 the speed and rotor fluxes of the motor, based on the sensed signal 007 and the adaptive estimator 167. Estimated speed and amplitude of rotor flux 165 and reference speed and flux amplitude 187 are utilized to determine 180 reference voltages 125 to the motor. The motor 106 is controlled 190 through the inverter 135 and power supply 004.

As shown in FIG. 2B, given a simplified model of the motor 143, a transformed model of the motor is determined 150 to produce a transformed model 155. An adaptive state estimator 167 is determined 160, based on the transformed model 155. Given the transformed model and the measured stator currents and voltages of the motor 007 with, the adaptive state estimator 160 estimates 170 the estimated flux and parameters. In some embodiments, the estimate parameter includes at least the rotor speed. A control command 125, preferred three-phase voltages for a three-phase motor, is determined 180, according to the estimate speed and flux amplitude, and reference speed and flux amplitude 187. The motor is controlled 190, where, in some embodiment, an inverter is used to generate voltages of the motor, according to the control command 125.

FIG. 2C shows different examples of the simplified model 143 used by some embodiments to produce the transformed model of the motor. Notably, all examples 143*a*, 143*b*, and 143*c* of the simplified model 143. FIG. 2C illustrates why the simplified model 143 makes it difficult to perform convergent estimation of the state and parameters. Specifically, the examples of the simplified model 143 include products 210*a*, 210*b*, and 210*c* of unmeasured state and parameters in the state dynamics, cause the difficulties.

Let us start with the following representation of the simplified model of the motor $$\dot{x}=A_1 x+A_2(\omega)\bar{x}+Bu$$

$$\dot{\omega}=0$$

where $\bar{x}=[\Phi_{dr}, \Phi_{qr}]^T$, and $A_1$, $A_2$ are appropriate matrices. A prevailing adaptive estimator for the state and parameter estimation takes the form of $$\dot{\hat{x}}=A_1\hat{x}+A_2(\hat{\omega})\hat{\bar{x}}+Bu+L(y-\hat{y})$$

$$\hat{y}=C\hat{x}$$

$$\dot{\hat{\omega}}=\mu(y,u,\hat{x},\hat{\omega})$$

where variables with ^ denote their estimates, and L is an estimator gain matrix. The estimator design problem is to determine L to ensure that state estimation error $\tilde{x}(t)=x(t)-\hat{x}(t)$ and parameter estimation error $\tilde{\omega}(t)=\omega(t)-\hat{\omega}(t)$ go to zero as time t approach infinity. Equivalently, the following estimation error dynamics are convergent $$\dot{\tilde{x}}=(A_1-LC)\tilde{x}+A_2(\omega)\bar{x}-A_2(\hat{\omega})\hat{\bar{x}}$$

$$\dot{\tilde{\omega}}=-\mu(y,u,\hat{x},\hat{\omega})$$

The state estimation error dynamics are rearranged as follow $$\dot{\tilde{x}}=(A_1-LC)\tilde{x}+(A_2(\omega)+A_2(\hat{\omega})-A_2(\hat{\omega}))\bar{x}-A_2(\hat{\omega})\hat{\bar{x}}$$

$$=(A_1-LC)\tilde{x}+A_2(\hat{\omega})\tilde{\bar{x}}+A_2(\tilde{\omega})\bar{x}$$

$$=(A-LC+A_2(\hat{\omega})B_2)\tilde{x}+A_2(\tilde{\omega})\bar{x}$$

where $B_2$ is a 2×4 matrix satisfying $$B_2\tilde{x}=\tilde{\bar{x}}$$

To ensure the convergence of the state and parameter estimation error dynamics, one needs to design the gain matrix L to render all eigenvalues of $(A-LC+A_2(\hat{\omega})B_2)$ are in the left half complex plane for all $\hat{\omega}$; and design the adaptive law $-\mu(y,u,\hat{x},\hat{\omega})$ to stabilize $\tilde{\omega}$ as well as completely cancel the effect of the term $A_2(\tilde{\omega})\bar{x}$ on the state estimation error dynamics. Both tasks are non-trivial for those skilled in the art.

If the state dynamics of the motor do not include the terms involving products of unmeasured state and parameters, estimator design can be simplified, as well as result in convergent estimation of the state and parameters. This disclosure teaches how changes of state coordinates, or state transformation, can be utilized to put the simplified model of the motor into a transformed model of the motor, where the terms involving products of unmeasured state and parameters are absent from the state dynamics; and shows a design procedure of an estimator which is straightforward and yield convergent estimation. This disclosure further teaches how to use the system realization theory to derive the transformed model of the motor in another expression.

FIG. 2D is a schematic of an example of the transformed model of the motor used by some embodiments. As can be seen, the dynamics of the transformed state is defined by a sum of components, each component is a linear function of the transformed state and at least one of the unknown parameters of the transformed model. For example, when the transformed model includes $$\dot{z}=A_z z+\psi(y,u)\theta+B_z u; \; y=C_z z; \; \dot{\theta}=0,$$

wherein z is the transformed state, y is the measured current, u is the measured voltage, θ is the unknown parameters of the transformed model, A, B, C are the known parameters of the transformed model, and ψ is a function of the measurements of the sensor. An evident feature of the transformed model is that its state dynamics do not include product terms of unmeasured state and parameters. Particularly, the state dynamics are influenced by parameter through measured quantities ψ(y,u).

Figure 3A:
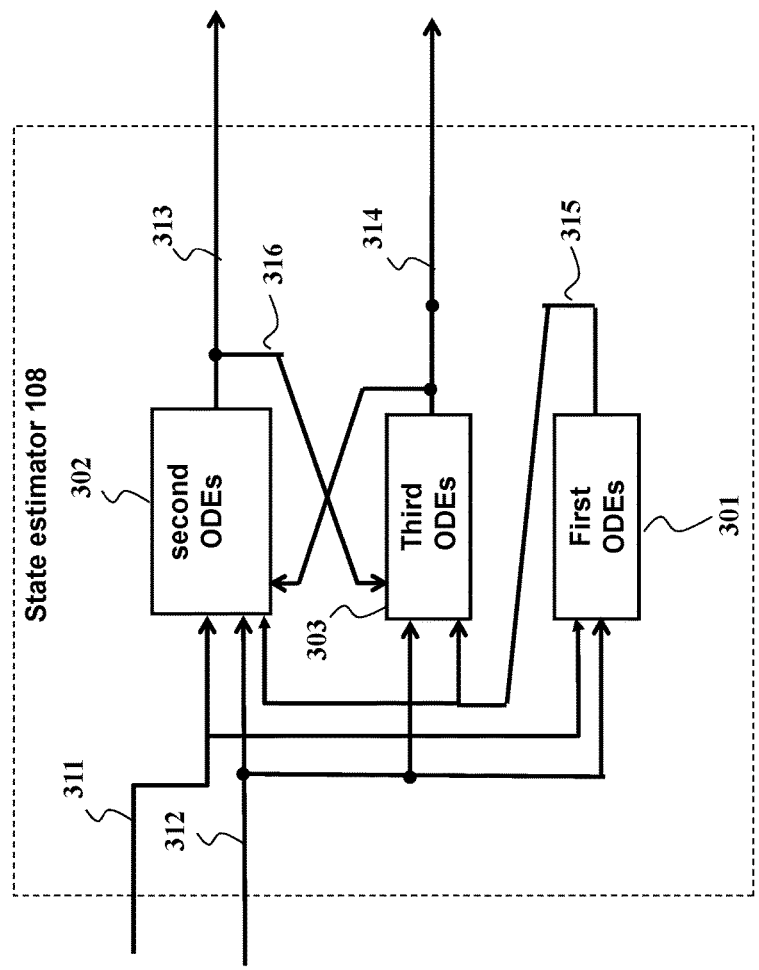
FIG. 3A is a block diagram of an adaptive state estimator of the motor controller according to some embodiments.

FIG. 3A shows a block diagram of the disclosed adaptive state estimator 108 of the field-oriented control system in FIG. 1B. The state estimator 108 implemented by the processor 010 solves a dynamic system of a set of ordinary differential equations (ODEs) including a first ODEs 301, a second ODEs 302, and a third ODEs 303. The signal 311 denotes measured stator winding terminal voltages, i.e., $u_{ds}$ and $u_{qs}$, of the induction motor in the stationary frame, and the signal 312 denotes measured stator winding currents, i.e., $i_{ds}$ and $i_{qs}$, of the induction motor in the stationary frame. The output signal 313 is the estimated stator currents and rotor flux, denoted by $\hat{i}_{ds}$, $\hat{i}_{qs}$ and $\hat{\Phi}_{dr}$, $\hat{\Phi}_{qr}$, respectively. The first ODEs 301 defines dynamics of time-series signal 315 as a function of the measurements of voltage and current, and outputs the time-series signal 315 to the second ODEs 302 and the third ODEs 303. The second ODEs 302 defines dynamics of estimated current and estimated flux of the motor, and outputs the estimated current and estimated rotor flux 313. The third ODE defines dynamics of estimated model parameters 314, denoted by $\hat{\theta}$, of the motor as a function of the time-series signal 315 and an error between the measured 312 and the estimated current 316 of the motor.

In such a manner, the first ODE defines dynamics of a time-series signal as a function of the measurements of the voltage and the current, the second ODE defines dynamics of estimate of the transformed state of the motor including an estimate of a current through the motor using the time-series signal and the measurements of the voltage and the current, and the third ODE defines dynamics of the estimate of the speed of the motor as a function of the time-series signal and an error between the measured and the estimated current of the motor.

In some embodiment, the estimated model parameter 314 is an estimated speed, denoted by $\hat{\omega}$, of the motor rotor. In another embodiment, the estimated model parameter 314 include the estimated speed, an estimate of the model parameter α, denoted by $\hat{\alpha}$, an estimate of the model parameter γ, denoted by $\hat{\gamma}$, and so on. Depending on the embodiment of the estimated model parameter 314, the first, second, and third ODEs have distinct implementation.

This disclosure teaches the adaptive state estimator design, on the basis of some embodiments of a transformed model of the motor, including embodiments of the first ODEs, the second ODEs, and the third ODEs.

In one embodiment, where the parameter to estimate is denoted θ, the transformed model of the motor takes the following expression $\dot{z}=A_z z+\psi(y,u)\theta+B_z u$ $\dot{\theta}=0$ $y=C_z z,$ (3)

where z has the same dimension of 4, and $A_z, B_z, C_z$ are appropriate constant matrices. Variables in the vector z are globally diffeomorphic to x, i.e., they uniquely determine the stator currents and the rotor flux. For simplicity and without causing confusion, we also call the vector z the stator currents and the rotor flux. Given (3), an adaptive state estimator is designed as follows $\dot{M}=(A_z-L_z C_z)M+\psi(y,u)$ $\dot{\hat{z}}=A_z\hat{z}+\psi(y,u)\hat{\theta}+B_z u+L_z(y-\hat{y})+\lambda MM^T C_z^T(y-\hat{y})$ $\dot{\hat{\theta}}=\lambda M^T C_z^T(y-\hat{y})$ $\hat{y}=C_z\hat{z}$ (4)

where $L_z$ is a constant gain matrix having 4 rows and 2 columns. In one embodiment, λ is a scalar; in another embodiment, λ is a diagonal square matrix having the same dimension as the number of unknown parameters. Components in λ are used to adjust estimation speed of unknown parameters. The first ODEs defines dynamics of the time-series signal M; the second ODEs defines the dynamics of the estimated stator current and rotor flux $\hat{z}$; the third ODEs defines the dynamics of the estimated parameter $\hat{\omega}$; and $\hat{y}$ denotes the estimated stator currents 312.

Figure 3B:
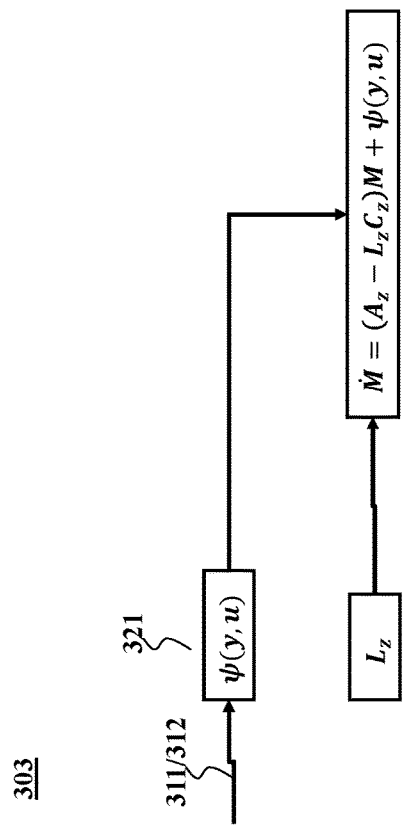
FIG. 3B is a schematic of a first ODEs defining dynamics of a time-series signal according to some embodiments.
Figure 3C:
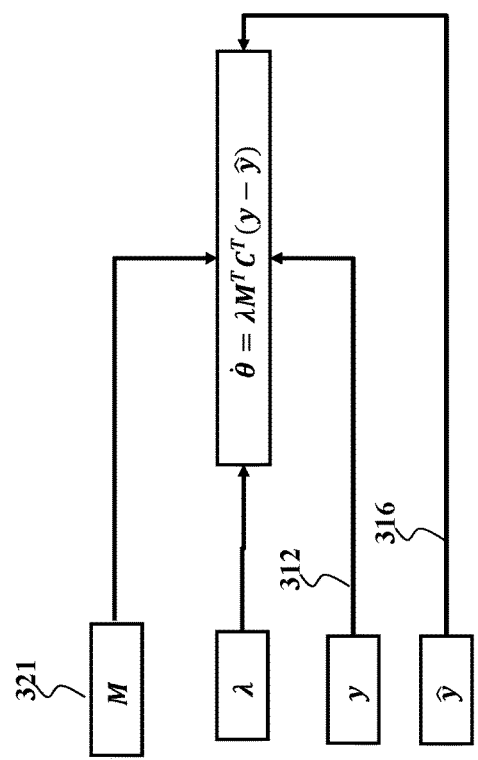
FIG. 3C is a schematic of a second ODEs defining dynamics of the transformed state according to some embodiments.

FIG. 3B illustrates the first ODEs; FIG. 3C illustrates the third ODEs. In one embodiment, where only the rotor speed ω is treated as the parameter to estimate, i.e., θ=ω, the transformed model of the motor takes the following expression $\dot{z}=A_z z+\psi(y,u)\omega+B_z u$ $\dot{\omega}=0$ $y=C_z z,$ (5)

where $$A_z = \begin{bmatrix} -\gamma-\alpha & 1 & 0 & 0 \\ -\alpha(\gamma-\alpha\beta L_m) & 0 & 0 & 0 \\ 0 & 0 & -\gamma-\alpha & 1 \\ 0 & 0 & -\alpha(\gamma-\alpha\beta L_m) & 0 \end{bmatrix}$$ (6)

$$\psi(y,u) = \begin{bmatrix} -y_2 \\ -(\gamma-\alpha\beta L_m)y_2+\frac{u_q}{\sigma} \\ y_1 \\ (\gamma-\alpha\beta L_m)y_1-\frac{u_d}{\sigma} \end{bmatrix}, B_z=\frac{1}{\sigma}\begin{bmatrix} 1 & 0 \\ \alpha & \omega \\ 0 & 1 \\ -\omega & \alpha \end{bmatrix}.$$

Given (8), an adaptive state estimator is designed as follows $\dot{M}=(A_z-L_z C_z)M+\psi(y,u)$ $\dot{\hat{z}}=A_z\hat{z}+\psi(y,u)\hat{\omega}+B_z u+L_z(y-\hat{y})+\lambda MM^T C_z^T(y-\hat{y})$ $\dot{\hat{\omega}}=\lambda M^T C_z^T(y-\hat{y})$ $\hat{y}=C_z\hat{z},$ (7)

where $L_z$ is a gain matrix having 4 rows and 2 columns, and λ is a scalar. The first ODEs defines dynamics of the time-series signal M; the second ODEs defines the dynamics of the estimated stator current and rotor flux $\hat{z}$; the third ODEs defines the dynamics of the estimated parameter $\hat{\omega}$; and $\hat{y}$ denotes the estimated stator currents 312.

In one embodiment, $L_z$ is a constant gain matrix and λ is constant; in another embodiment, λ varies according to the reference speed: the lower the reference speed is, the larger λ is.

In one embodiment, the transformed model (8) is derived by performing the following steps to the simplified model (2)

1. Introduce a first state transformation $$\xi = \begin{bmatrix} i_{ds} \\ i_{qs} \\ i_{ds} + \beta\phi_{dr} \\ i_{qs} + \beta\phi_{qr} \end{bmatrix},$$

where $\xi = [\xi_1, \xi_2, \xi_3, \xi_4]^T$. The first state transformation puts the simplified model (2) into the following $$\dot{\xi} = A_\xi \xi + B_\xi u$$

$$\dot{\omega} = 0$$

$$y = C_\xi \xi, \quad (8)$$

where $$A_\xi = \begin{bmatrix} -\gamma - \alpha & -\omega & \alpha & \omega \\ \omega & -\gamma - \alpha & -\omega & \alpha \\ \alpha\beta L_m - \gamma & 0 & 0 & 0 \\ 0 & \alpha\beta L_m - \gamma & 0 & 0 \end{bmatrix}, B_\xi = \frac{1}{\sigma}\begin{bmatrix} 1 & 0 \\ 0 & 1 \\ 1 & 0 \\ 0 & 1 \end{bmatrix}, C_\xi = C.$$

2. Define a second state transformation as follows $$\phi(\xi) = \underbrace{\begin{bmatrix} 1 & 0 & 0 & 0 \\ 0 & 0 & \alpha & \omega \\ 0 & 1 & 0 & 0 \\ 0 & 0 & -\omega & \alpha \end{bmatrix}}_{T}\xi.$$

and obtain the dynamics of z as follows $$\dot{z} = \overline{A}z + \overline{B}u, \; y = \overline{C}z$$

where $$\overline{A} = TA_\xi T^{-1} = \begin{bmatrix} -\gamma - \alpha & 1 & -\omega & 0 \\ -\alpha(\gamma - \alpha\beta L_m) & 0 & -\omega(\gamma - \alpha\beta L_m) & 0 \\ \omega & 0 & -\gamma - \alpha & 1 \\ \omega(\gamma - \alpha\beta L_m) & 0 & -\alpha(\gamma - \alpha\beta L_m) & 0 \end{bmatrix} \quad (9)$$

$$\overline{B} = TB_\xi = \frac{1}{\sigma}\begin{bmatrix} 1 & 0 \\ \alpha & \omega \\ 0 & 1 \\ -\omega & \alpha \end{bmatrix}, \overline{C} = CT^{-1} = \begin{bmatrix} 1 & 0 & 0 & 0 \\ 0 & 0 & 1 & 0 \end{bmatrix}.$$

The z-dynamics can be written in the form of the transformed model of the motor (8), with $A_z, B_z$, and $\psi(y,u)$ appropriately defined.

Figure 4A:
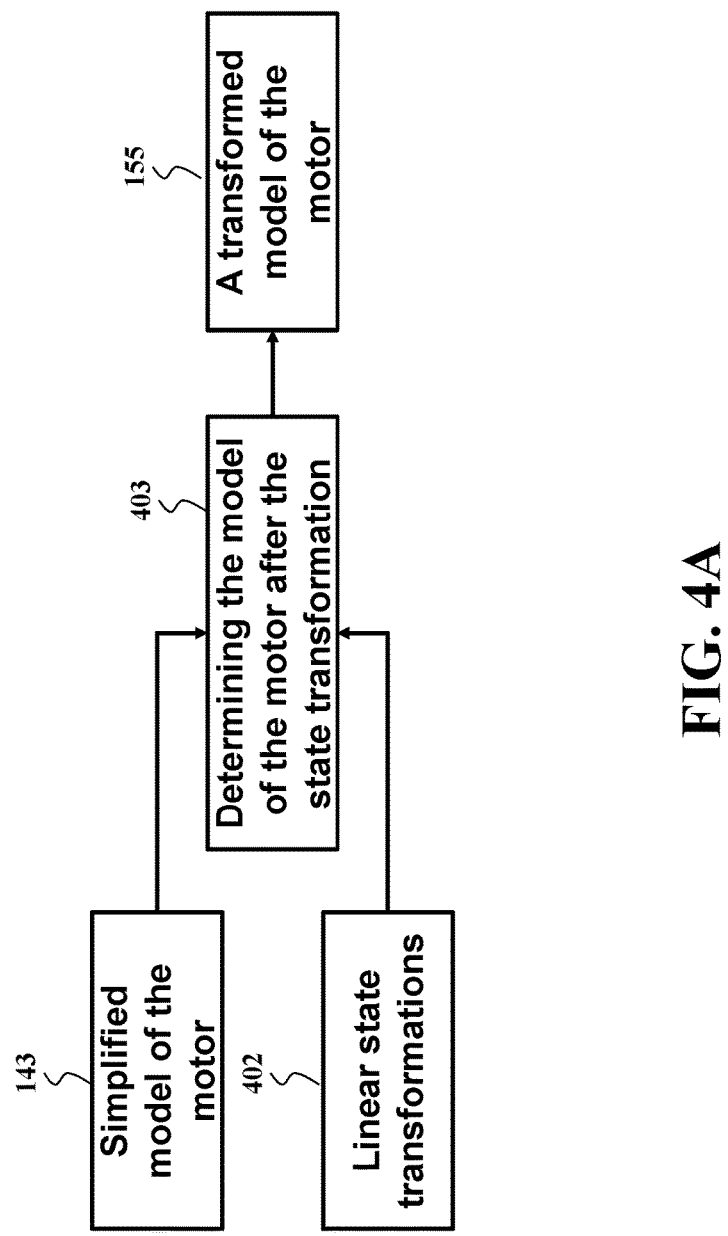
FIG. 4A is a block diagram of determining a transformed model of the motor according to the simplified model of the motor through applying a series linear state transformation, used by different embodiments.
Figure 4B:
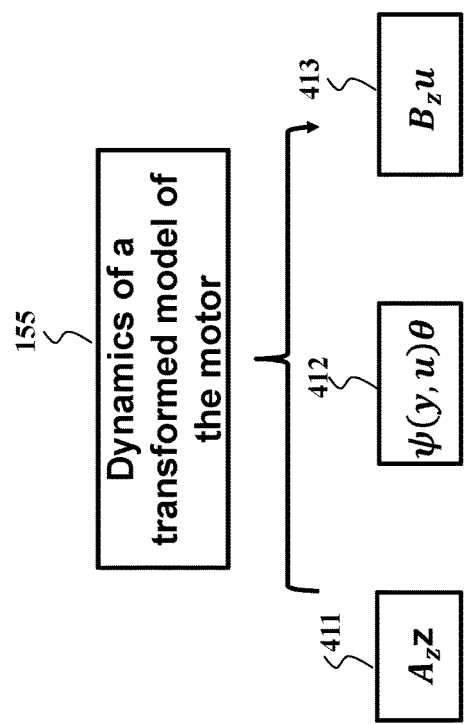
FIG. 4B is a schematic of dynamics of the transformed state used by different embodiments.

FIG. 4A illustrates the steps to determine 403 the transformed model (8) 155, based on the simplified model 143, and linear state transformations 402. The linear state transformations defines $\xi$ as a function of x, and z as a function $\xi$. FIG. 4B shows state dynamics of the transformed model of the motor, where its right-hand-side only consists of three terms 411, 412, and 413. Specifically, there is no terms involving unmeasured component of z and $\theta$.

Figure 5:
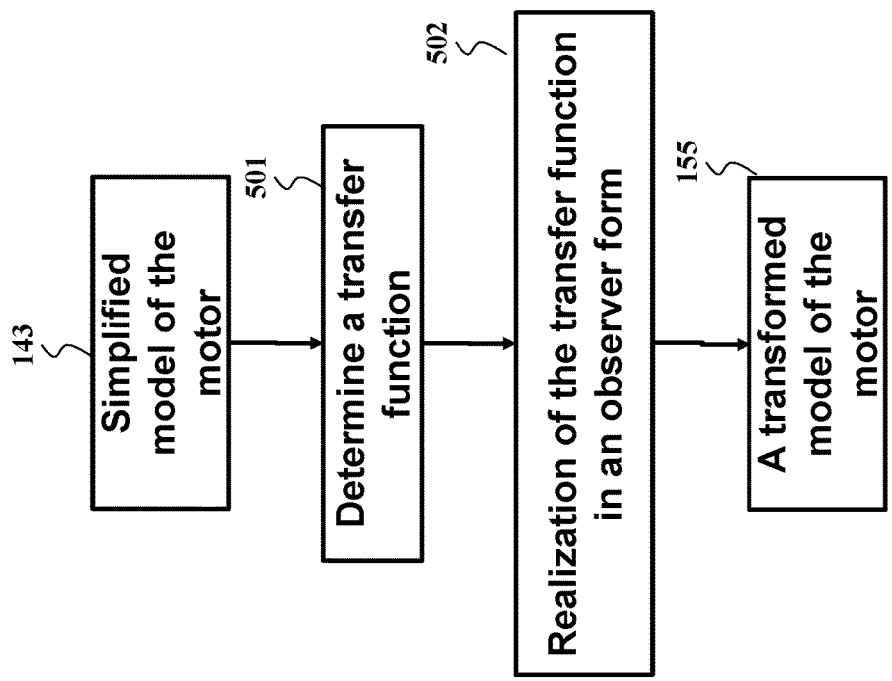
FIG. 5 is a block diagram of a method for determining a transformed model of the motor according to the simplified model of the motor through applying Laplacian transformation and system realization according to one embodiment.

FIG. 5 illustrates another embodiment to obtain the transformed model (4). A transfer function from the control voltages u to the output y of the simplified model 143 is determined 501 by taking Laplacian transformation of the simplified model 143, i.e., $$G(s) = Y(s)/U(s)$$

where G(s) is a matrix, and Y(s) and U(s) is the Laplacian function of y and u, respectively. Then a new realization 502 of the transfer function in the form (8) can be derived. From the new realization 502, the transformed model of the motor, particularly the expressions of $A_z, \psi(y,u)$ and $B_z$, can be determined readily.

In one embodiment, the realization of the transfer function is represented by a system of differential equations having exactly the same transfer function G(s), but the system dimension (number of state variables) is typically higher than the original x-system.

Rewrite the transfer function as follows $$G(s) = \frac{N(s)}{d(s)} = \frac{N_{r-1}s^{r-1} + \ldots + N_0}{s^r + \alpha_{r-1}s^{r-1} + \ldots + \alpha_0},$$

where d(s) is the least common multiple of denominators of all components in G(s), $\alpha_i$ for $0 \leq i \leq r-1$ are scalars, and $N_i$ for $0 \leq i \leq r-1$ are matrices. Note that $N_i$ and $\alpha_i$ for $0 \leq i \leq r-1$ depend on unknown parameters, linearly and nonlinearly. In one embodiment, a realization 502 of the transfer function can be given by the following system of differential equations $$\dot{z} = A(\theta)z + B(\theta)u$$

$$y = Cz,$$

where $$A = \begin{bmatrix} 0 & 0 & \ldots & -\alpha_3(\theta)I_2 \\ I_2 & 0 & \ldots & -\alpha_2(\theta)I_2 \\ \vdots & \ddots & \vdots & \vdots \\ 0 & \ldots & I_2 & -\alpha_0(\theta)I_2 \end{bmatrix}, B = \begin{bmatrix} N_3(\theta) \\ N_2(\theta) \\ \vdots \\ N_0(\theta) \end{bmatrix}, C_2 = [0 \; 0 \; \ldots \; I_2]$$

with $$I_2 = \begin{bmatrix} 1 & 0 \\ 0 & 1 \end{bmatrix}.$$

If $N_i$ and $\alpha$ are linear functions of the original parameters $\theta$, then the realization system can be rewritten into the transformed model (8) with $$A_z = \begin{bmatrix} 0 & 0 & \ldots & 0 \\ I_2 & 0 & \ldots & 0 \\ \vdots & \ddots & \vdots & \vdots \\ 0 & \ldots & I_2 & 0 \end{bmatrix}, B_z = \begin{bmatrix} \overline{N}_3 \\ \overline{N}_2 \\ \vdots \\ \overline{N}_0 \end{bmatrix}, C_z = [0 \; 0 \; \ldots \; I_2] \quad (10)$$

$$\psi(y, u) = \frac{\partial \Psi(y, u, \theta)}{\partial \theta},$$

where $\overline{N}_i$ for $0 \leq i \leq 3$ are independent of unknown parameters $\theta$, and $$\Psi(y, u, \theta) = \begin{bmatrix} -\alpha_3(\theta)I_2 y + (N_3(\theta) - \overline{N}_3)u \\ \vdots \\ -\alpha_0(\theta)I_2 y + (N_0(\theta) - \overline{N}_0)u \end{bmatrix}.$$

If $N_i$ and $\alpha$ are nonlinear functions of the original parameters $\theta$, one need to reparameterize matrices $N_i$ and $\alpha_i$ to ensure all unknown parameters appear linearly in $\psi(y, u, \theta)$, named after linear parameterization. That all components in $N_i$ and $\alpha_i$ which are nonlinear functions of $\theta$ should be treated known parameters; otherwise, the adaptive state estimator does not provide convergent estimates. Reparameterization defines a new set of parameters $P_n$ comprising of all non-zero components in matrices $N_i$ and scalar variables $\alpha_i$. As a result of reparameterization, the resultant system after the new realization is linear in parameters $P_n$, which can be estimated in the manner taught in this invention. It is clear that the parameter set $P_n$ also imply the original parameters. Matrices of $N_i$ are consistent with the dimension of $G(s)$.

Figure 6:
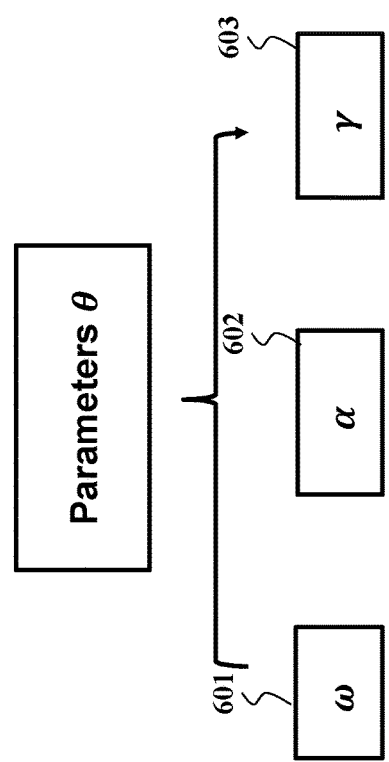
FIG. 6 is a schematic of examples of parameters to be estimated by the adaptive state estimator according to some embodiments.

FIG. 6 shows examples of parameters to be estimated by the adaptive state estimator according to some embodiments. In one embodiment, under assumption that both $R_s/\sigma$ and $\sigma$ are known and the system is persistently excited, $\gamma$ 603, $\alpha$ 602 and $\omega$ 601, given in FIG. 6, can be treated as parameters, and jointly estimated with exponential convergence. To that end, some embodiments use the transformed model in the following expression $$\dot{z} = A_z z + \psi(y, u)\theta + B_u u,$$

where $\theta = [\varphi, \gamma, \alpha]^T$. In some implementations $$A_z = \begin{bmatrix} 0 & 1 & 0 & 0 \\ 0 & 0 & 0 & 0 \\ 0 & 0 & 0 & 1 \\ 0 & 0 & 0 & 0 \end{bmatrix} \tag{11}$$

$$B_u = \frac{1}{\sigma}\begin{bmatrix} 1 & 0 \\ 0 & 0 \\ 0 & 1 \\ 0 & 0 \end{bmatrix}, \psi(y, u) = \begin{bmatrix} -y_2 & -y_1 & -y_1 \\ \frac{u_q}{\sigma} - \kappa y_2 & 0 & \frac{u_d}{\sigma} - \kappa y_1 \\ y_1 & -y_2 & -y_2 \\ \kappa y_1 - \frac{u_d}{\sigma} & 0 & \frac{u_q}{\sigma} - \kappa y_2 \end{bmatrix},$$

Accordingly, the first ODEs, the second ODEs, and the third ODEs of the adaptive state estimator can be taken as (4), where $M \in \mathbb{R}^{4 \times 3}$.

In one embodiment, a lower dimensional adaptive state estimator can be designed on the basis of the dynamics of $\xi$-system. The proposed adaptive observer is given by $$\dot{\hat{\xi}} = \hat{A}_\xi \hat{\xi} + B_\xi u + L_\xi(y - \hat{y})$$

$$\dot{\hat{\omega}} = \lambda(\hat{\xi}_1(\hat{\xi}_4 - \hat{\xi}_2) + \hat{\xi}_2(\hat{\xi}_1 - \hat{\xi}_3))$$

$$\hat{y} = C_\xi \hat{\xi}, \tag{12}$$

where $\hat{A}_\xi = A_\xi(\hat{\omega})$. The resultant error dynamics are $$\dot{\tilde{\xi}} = (A_\xi - L_\xi C_\xi)\tilde{\xi} + (A_\xi - \hat{A}_\xi)\hat{\xi}$$

$$\dot{\tilde{\omega}} = -\lambda(\hat{\xi}_1(\hat{\xi}_4 - \hat{\xi}_2) + \hat{\xi}_2(\hat{\xi}_1 - \hat{\xi}_3))$$

$$\tilde{y} = C_\xi \tilde{\xi}, \tag{13}$$

Particularly, one notices that $$A_\xi - \hat{A}_\xi = \begin{bmatrix} 0 & -\tilde{\omega} & 0 & \tilde{\omega} \\ \tilde{\omega} & 0 & -\tilde{\omega} & 0 \\ 0 & 0 & 0 & 0 \\ 0 & 0 & 0 & 0 \end{bmatrix},$$

and $$\hat{\xi}^T(A_\xi - \hat{A}_\xi) = [\hat{\xi}_2 - \hat{\xi}_4 - \hat{\xi}_1 - \hat{\xi}_2 \hat{\xi}_1]\tilde{\omega}.$$

The adaptive state estimator produces exponentially convergent estimator of x, but only stable estimation of $\omega$, under the assumption that $A_\xi - L_\xi C_\xi$ is Hurwitz. In this embodiment, the first ODEs is implicit. In the original x-coordinates, the third ODEs is written as follows $$\dot{\hat{\omega}} = \lambda \beta(\tilde{i}_{ds}\hat{\phi}_{qr} - \tilde{i}_{qs}\hat{\phi}_{dr}).$$

Although have the same adaptation laws, the baseline and the proposed adaptive estimator differ from each other for their x or $\xi$ estimation.

The aforementioned adaptive estimator design relies on the assumption that $A_\xi - L_\xi C_\xi$ is Hurwitz. With $A_\xi$ being dependent on $\omega$, finding $L_\xi$ to ensure the assumption is not straightforward, and the matrix $L_\xi$ shall be a function of $\omega$ to ensure consistent convergence rate for all $\omega$.

In one embodiment, the persistent excitation condition is formulated as follows. Assume the control input u ensures that persistent excitation condition holds, i.e., there exist positive finite constants $\rho_1$, $\rho_2$,T such that for any t>0 $0 < \rho_1 I_n \leq \int_t^{t+T} M^T(t) C_z^T C_z M(t) dt \leq \rho_2 I_n < +\infty,$ where $I_n$ is a n×n identity matrix, and n represents the number of unknown parameter to be estimated.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A motor drive for controlling an operation of an induction motor, comprising:
    a motion controller to provide a reference signal for controlling the operation of the motor, the reference signal includes one or combination of a reference flux of a rotor of the motor and a reference speed of the rotor of the motor;
    at least sensor to measure a voltage to the motor and a current through the motor during the operation of the motor;
    a memory to store a transformed model relating dynamics of a transformed state of the motor with the measurements of the sensor through parameters of the transformed model, wherein at least some parameters of the transformed model are unknown, wherein the unknown parameters of the transformed model includes the speed of the motor, wherein the transformed state of the motor is a function of an electromagnetic state of the motor defined at least in part by the current through the motor and a flux of the motor, and the parameters of the transformed model, wherein the dynamics of the transformed state is defined by a sum of components, each component is a linear function of the transformed state and at least one of the unknown parameters of the transformed model;
    a motor controller to estimate the unknown parameters of the transformed model to produce an estimate of the speed of the motor and an estimate of the flux of the motor based on the measurements of the sensor and the transformed model of the motor, and to produce a reference voltage to track the reference signal based on the estimate of the speed of the motor and the estimate of the flux of the motor; and
    an inverter to produce the voltage to the motor based on the reference voltage.

2. The motor drive of claim 1, wherein the motor controller comprises:
    a state estimator to determine the estimate of the speed of the motor and the estimate of the flux of the motor;
    a flux controller to produce a d-axis current reference value based on a difference between the reference flux and the estimated flux of the motor;
    a speed controller to produce a q-axis current reference value based on a difference between the reference speed and the estimated speed of the motor;
    a d-axis current controller to produce a d-axis reference voltage based on a difference between the d-axis current reference and the measured d-axis current through of the motor;
    a q-axis current controller to produce a q-axis reference voltage based on a difference between the q-axis current reference and the measured q-axis current through of the motor; and
    an transformer to convert the d-axis reference voltage and the q-axis reference voltage into three-phased reference voltages to the motor, wherein the inventor produce the voltage to the motor according to the three-phased reference voltages.

3. The motor drive of claim 1, wherein the motor controller include a processor configured to estimate the speed of the motor by solving a dynamic system of at a set of ordinary differential equations (ODEs) including a first ODE, a second ODE, and a third ODE, wherein the first ODE defines dynamics of a time-series signal as a function of the measurements of the voltage and the current, wherein the second ODE defines dynamics of estimate of the transformed state of the motor including an estimate of a current through the motor using the time-series signal and the measurements of the voltage and the current, and wherein the third ODE defines dynamics of the estimate of the speed of the motor as a function of the time-series signal and an error between the measured and the estimated current of the motor.

4. The motor drive of claim 3, wherein the motor controller estimates the speed of the motor using a product of a gain, a value of the time-series signal at the current control step, and the error between the measured and the estimated current at the current control step.

5. The motor drive of claim 1, wherein the transformed model is obtained by transforming a baseline model into a different coordinate system using a state transformation including parameters of the baseline model.

6. The motor drive of claim 5, wherein the transformed model has the same number of differential equations as the baseline model.

7. The motor drive of claim 1, wherein the transformed model is obtained by
    applying a Laplacian transformation to a baseline model to derive a transfer function relating the voltage to the motor with the current through the motor; and
    deriving the transform model from the transfer function via a system realization.

8. The motor drive of claim 7, wherein the transformed model has more differential equations than the baseline model, but the same transfer function resulting from the Laplacian transformation of the transformed model.

9. The motor drive of claim 1, wherein the transformed model includes $$\dot{z}=A_z z+\psi(y,u)\theta+B_z u;\ y=C_z z;\ \dot{\theta}=0,$$

wherein z is the transformed state, y is the measured current, u is the measured voltage, $\theta$ is the unknown parameters of the transformed model, A, B, C are the known parameters of the transformed model, and $\psi$ is a function of the measurements of the sensor.

10. The motor drive of claim 9, wherein the $\theta$ includes an inverse of the time constant of the stator current dynamics $\gamma$, an inverse of the time constant of the rotor flux dynamics $\alpha$, and the speed of the motor $\omega$.

11. A system to perform an operation, comprising:
    the motor drive of claim 1 to control the motor; and
    the motor to perform the operation of the system.

12. A method for controlling an operation of an induction motor, comprising:
    providing a reference signal for controlling the operation of the motor, the reference signal includes one or combination of a reference flux of a rotor of the motor and a reference speed of the rotor of the motor;
    measuring a voltage to the motor and a current through the motor during the operation of the motor;
    retrieving a transformed model relating dynamics of a transformed state of the motor with the measurements of the sensor through parameters of the transformed model, wherein at least some parameters of the transformed model are unknown, wherein the unknown parameters of the transformed model includes the speed of the motor, wherein the transformed state of the motor is a function of an electromagnetic state of the motor defined at least in part by the current through the motor and a flux of the motor, and the parameters of the transformed model, wherein the dynamics of the transformed state is defined by a sum of components, each component is a linear function of the transformed state and at least one of the unknown parameters of the transformed model;

estimating the unknown parameters of the transformed model to produce an estimate of the speed of the motor and an estimate of the flux of the motor based on the measurements of the sensor and the transformed model of the motor, and to produce a reference voltage to track the reference signal based on the estimate of the speed of the motor and the estimate of the flux of the motor; and producing the voltage to the motor based on the reference voltage.

13. The method of claim 12, wherein the speed of the motor is estimated by solving a dynamic system of at a set of ordinary differential equations (ODEs) including a first ODE, a second ODE, and a third ODE, wherein the first ODE defines dynamics of a time-series signal as a function of the measurements of the voltage and the current, wherein the second ODE defines dynamics of estimate of the transformed state of the motor including an estimate of a current through the motor using the time-series signal and the measurements of the voltage and the current, and wherein the third ODE defines dynamics of the estimate of the speed of the motor as a function of the time-series signal and an error between the measured and the estimated current of the motor.

14. The method of claim 13, wherein the speed of the motor is estimated using a product of a gain, a value of the time-series signal at the current control step, and the error between the measured and the estimated current at the current control step.

15. The method drive of claim 12, further comprising:
transforming a baseline model into a different coordinate system using a state transformation including parameters of the baseline model to obtain the transformed model.

16. The method of claim 15, wherein the transformed model has the same number of differential equations as the baseline model.

17. The method of claim 12, further comprising:
applying a Laplacian transformation to a baseline model to derive a transfer function relating the voltage to the motor with the current through the motor; and
deriving the transform model from the transfer function via a system realization.

18. The method of claim 17, wherein the transformed model has more differential equations than the baseline model, but the same transfer function resulting from the Laplacian transformation of the transformed model.

19. The motor drive of claim 12, wherein the transformed model includes $$\dot{z}=A_z z+\psi(y,u)\theta+B_z u;\ y=C_z z;\ \dot{\theta}=0,$$

wherein z is the transformed state, y is the measured current, u is the measured voltage, $\theta$ is the unknown parameters of the transformed model, A, B, C are the known parameters of the transformed model, and $\psi$ is a function of the measurements of the sensor.

20. A non-transitory computer readable storage medium embodied thereon a program executable by a processor for performing a method, the method comprising:

receiving a reference signal for controlling the operation of the motor, the reference signal includes one or combination of a reference flux of a rotor of the motor and a reference speed of the rotor of the motor;

receiving measurements of a voltage to the motor and a current through the motor during the operation of the motor;

retrieving a transformed model relating dynamics of a transformed state of the motor with the measurements of the sensor through parameters of the transformed model, wherein at least some parameters of the transformed model are unknown, wherein the unknown parameters of the transformed model includes the speed of the motor, wherein the transformed state of the motor is a function of an electromagnetic state of the motor defined at least in part by the current through the motor and a flux of the motor, and the parameters of the transformed model, wherein the dynamics of the transformed state is defined by a sum of components, each component is a linear function of the transformed state and at least one of the unknown parameters of the transformed model;

estimating the unknown parameters of the transformed model to produce an estimate of the speed of the motor and an estimate of the flux of the motor based on the measurements of the sensor and the transformed model of the motor, and to produce a reference voltage to track the reference signal based on the estimate of the speed of the motor and the estimate of the flux of the motor; and causing an operation of the motor with the voltage produced based on the reference voltage.

* * * * *